Sept. 14, 1937.  A. KREUSER  2,093,281

FRICTION COUPLING

Filed Oct. 19, 1933  5 Sheets-Sheet 1

Inventor
ADOLF KREUSER, DECEASED
ADOLF KREUSER, ADMINISTRATOR
by W. E. Evans,
Attorney.

Sept. 14, 1937.   A. KREUSER   2,093,281
FRICTION COUPLING
Filed Oct. 19, 1933   5 Sheets-Sheet 2

Inventor
ADOLF KREUSER, DECEASED
ADOLF KREUSER, ADMINISTRATOR
By   W. S. Evans,
Attorney.

Sept. 14, 1937.  A. KREUSER  2,093,281
FRICTION COUPLING
Filed Oct. 19, 1933  5 Sheets-Sheet 3

Inventor
ADOLF KREUSER, DECEASED
ADOLF KREUSER, ADMINISTRATOR
by W. L. Evans
Attorney.

Sept. 14, 1937.   A. KREUSER   2,093,281
FRICTION COUPLING
Filed Oct. 19, 1933   5 Sheets-Sheet 4

Inventor
ADOLF KREUSER, DECEASED
ADOLF KREUSER, ADMINISTRATOR
by W. E. Evans
Attorney.

Sept. 14, 1937.　　　　A. KREUSER　　　　2,093,281
FRICTION COUPLING
Filed Oct. 19, 1933　　　　5 Sheets-Sheet 5

Inventor
ADOLF KREUSER, DECEASED
ADOLF KREUSER, ADMINISTRATOR
by W. E. Evans
Attorney.

Patented Sept. 14, 1937

2,093,281

UNITED STATES PATENT OFFICE 2,093,281

FRICTION COUPLING

Adolf Kreuser, deceased, late of Hamm, Westphalia, Germany, by Adolf Kreuser, Hamm, Westphalia, Germany, administrator Application October 19, 1933, Serial No. 694,354
In Germany October 19, 1932

8 Claims. (Cl. 192—85)

The invention relates to friction couplings of the type comprising a hollow coupling member which is expanded by a pressure medium (such as water or oil under pressure, compressed air, steam or the like), and is thus pressed so firmly against a second coupling member that movement can be imparted by one coupling member to the other.

According to the invention the expansible wall of the hollow member which acts as the friction surface is formed as a metal tube the axis of which coincides with the axis of the coupling the ends of which are integral with or rigidly secured in a fluid-tight manner to the inner or outer coupling member to which the tube is related and the metal tube is of such dimensions that the friction surfaces of the two coupling members may operate as bearing surfaces during free running. The invention also relates to the particular construction of the friction surfaces, that is to say those surfaces which are brought into intimate contact with each other by the expanding of the hollow member. Furthermore the invention relates to particular applications of the coupling.

The accompanying drawings illustrate by way of example several constructions and applications of the friction coupling according to the invention.

Figure 1:
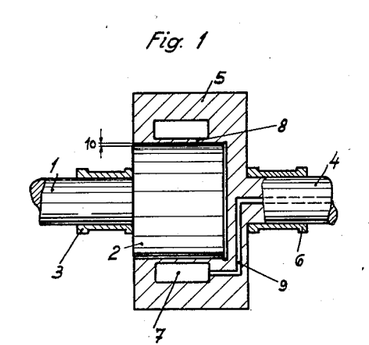
Figure 1 shows, in full section, a coupling for connecting together two shafts.

Referring to the drawings:

In Figure 1, 1 is the power driven shaft having the clutch core 2 made of metal such as steel; the shaft is mounted in the bearings 3. 4 is the shaft that is to be driven by engagement of the clutch; this shaft 4 is provided with the clutch sleeve 5 which is made of metal and is mounted in the bearings 6. The clutch sleeve 5 of robust construction is provided with an annular chamber 7 of which the tubular wall 8 separating it from the clutch core 2 is relatively thin. A bored out channel 9 extends advantageously from the centre of the shaft 4 to the annular chamber 7. If a pressure medium such as oil under pressure be passed through the channel 9 into the chamber 7, the thin wall 8 is expanded; this reduces the size of the interstitial space 10 which is finally eliminated abreast of the wall 8. The sleeve friction surface of the shaft 4 to be driven is thus pressed firmly upon the surface of the clutch core 2 of the power driven shaft 1 and thus the clutch is caused to engage. If the pressure is released through the channel 9, frctional engagement between the friction surfaces is released. The interstitial space 10 is restored as the stress to which the wall 8 is subjected lies beneath the elastic limit of the metal of which it is made.

Figure 2:
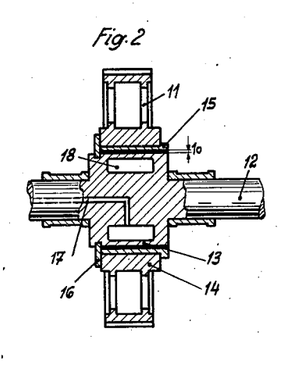
Figure 2 shows, in full section, a clutch for connecting a shaft to a gear wheel.

Whereas Figure 1 represents a construction in which the annular chamber to be placed under pressure lies in the clutch sleeve 5, Figures 2, 3, 4 and 5 show examples in which the annular chamber is in the clutch core 2. In Figure 2 the toothed wheel 11 runs with its fixed bushing 15, with the shaft 12 stationary, directly upon the friction surface of the clutch core 13, formed with the annular chamber 18. The hub 14 of the toothed wheel 11 is in this case formed as a clutch sleeve of robust construction. The interstitial space 10 may lie within the limits usual in bearings; that is to say, it is about one-tenth to three-tenths of a millimetre wide according to the diameter of the clutch core 13. A ring 16 is screwed or otherwise connected to the toothed wheel 11 and engages in a corresponding recess in the clutch core preventing axial movement of the toothed wheel 11. The pressure medium is introduced through the tubular channel 17 into the annular chamber 18 between whose outer thin wall and the inner surface of the bushing 15 frictional engagement is produced.

Figure 3:
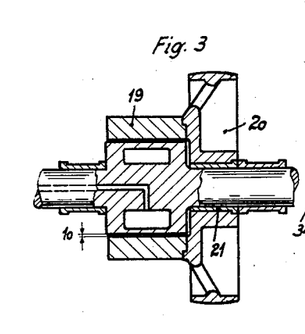
Figure 3 shows, in full section, a form of coupling for connecting a shaft to a belt pulley, the coupling being disposed to one side of the pulley.

The construction according to Figure 3 corresponds to that of Figure 2. In Figure 3 the clutch sleeve 19 forms a separate part to which is secured the belt pulley 20 with the loosely mounted bush 21 which may be secured to the pulley.

Figure 4:
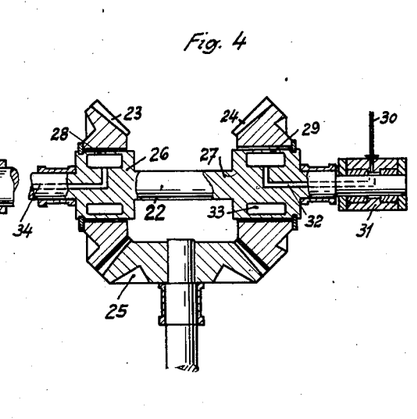
Figure 4 shows, in full section, a reversing gear with two couplings, the driven shaft rotating in one or other direction by engaging one or other of the left and right-hand couplings.

In Figure 4, 22 is a driving shaft adapted to be connected through clutches 26, 27 with either of two bevelled wheels 23 and 24 in mesh with a bevelled wheel 25 on the driven shaft. The clutch cores 26 and 27 have thin walls 28 and 29 on their external peripheries. The pressure medium passes through the stationary tube 30 mounted in the bearing or stuffing-box 31, thence through the channel 32 into the chamber 33, that is to say, into the clutch 27, while the clutch 26 is in similar manner supplied with the pressure medium through the channel 34. The toothed wheel 25 makes right-hand or left-hand rotational movements according as the pressure medium is supplied to one or other of the clutches, the shaft 22 rotating in one direction only.

Figure 5:
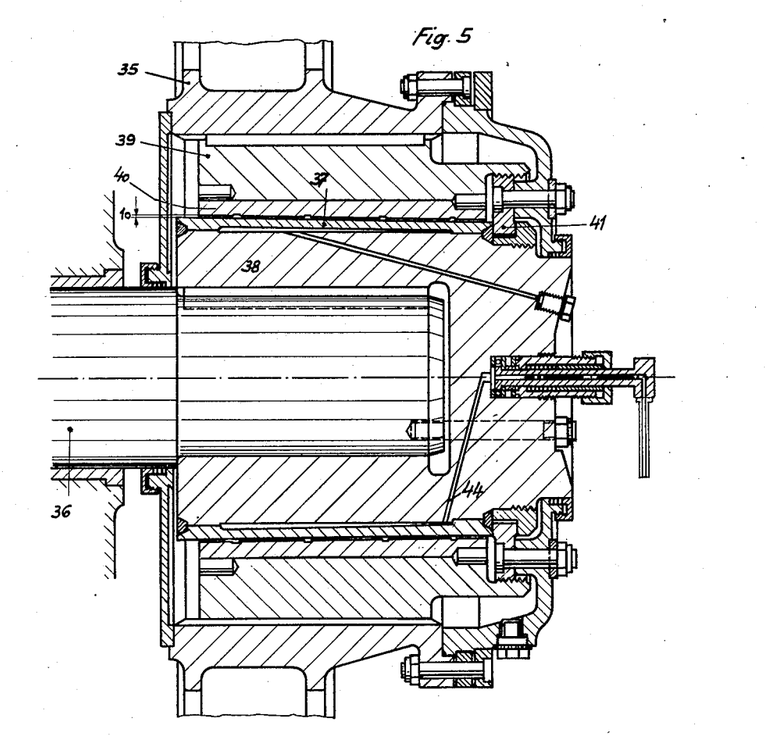
Figure 5 shows, in full section, a coupling according to the invention on an enlarged scale.

Figure 5 illustrates a clutch on an enlarged scale. The toothed wheel 35 normally runs loosely on the spindle 36 but is adapted to be clutched thereto. The clutch core 37 which is of forged steel consists of a relatively thin external wall and is shown as being welded at the ends to the hub 38 keyed to the shaft 36. The clutch core 37 is slightly conical in shape on the friction surface. The clutch sleeve 39 which is secured to the toothed wheel 35 by wedges or the like carries a bush 40, which is internally provided of the same conical shape as the core 37. The interstitial space 10 may be set by moving the clutch sleeve 39 with the bush 40 axially by means, for example, of a screw-threaded ring 41 adapted to be rotated to a limited degree in relation to the sleeve 39 and the bolts by which it is held in position upon the annular hub cap secured to the wheel 35 so that it is quite easy to make the necessary adjustments having regard to the wear which sets in in due course. In the modified construction shown in Figure 6, the ends of the clutch core 37 are thickened in the radial direction inwardly and are shrunk directly on to the hub 38. The hollow space 42, which for manufacturing reasons is of a considerable size in the shrunk construction because the ends of the clutch core 37 must be of very robust construction by reason of the shrinkage while the wall must be thin because it has to expand, must in that construction be as nearly as possible filled with a filling member 43 as represented in detail in Figure 7 with a view to economize in the volume of pressure medium present, because of the compressibility of liquids. The member 43 is made in several parts to facilitate the mounting of it in position.

Figures 6, 16, 17, 18, 19:
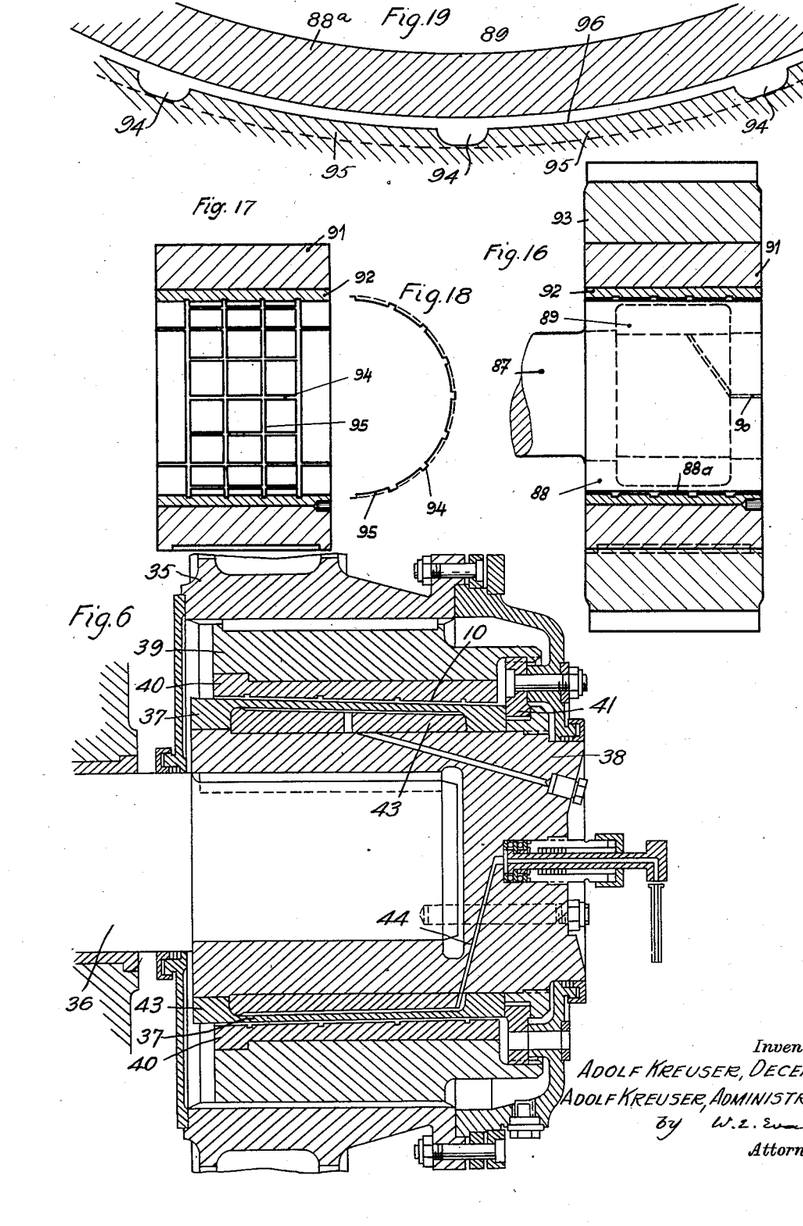
Figure 6 shows, in full section, a modification of the coupling shown in Figure 5.
Figure 16 is a longitudinal section of a coupling in which the frictional engagement is effected by means of a hollow member—in this case carried by the shaft—which is expanded by the introduction of a pressure medium.
Figure 17 is a longitudinal section through a coupling sleeve which illustrates one particular construction of the friction surface.
Figure 18 is a detail side elevation of the inner surface of the bush adapted to fit the outer member of the coupling shown in Figure 16.
Figure 19 is a cross-sectional view showing the film of lubricant on an enlarged scale.
Figure 7:
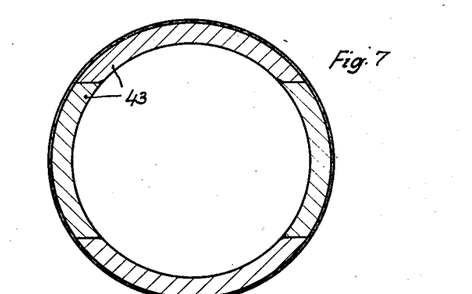
Figure 7 is a cross-section of a member for partly filling a chamber for a pressure medium.

In practice the bored-out space 42 is always maintained full with pressure medium that is not under pressure. For the purpose of effecting the engagement of the clutch the pressure medium is put under stress by a pump or an electric thrust magnet or from a plant or the like supplying liquid under pressure. To release the clutch the pressure medium is released from pressure without the space 42 being emptied. The pressure medium utilized every time the clutch is engaged is made up of the quantity of pressure medium required for enlarging the hollow space 42 with a view to the elimination of the interstitial space 10, and of that quantity of pressure medium which corresponds to the compressibility of the pressure medium in the hollow space 42, which is not previously compressed. It is known that the compressibility of liquids is inconsiderable in comparison with that of a gaseous medium but, nevertheless, a liquid is also compressible. The consumption of energy in the engaging of the clutch is minimized by partially filling the space 42 with the filling member 43. The clutch may in general be treated as a shaft in bearings, that is to say the interstitial space 10 may receive lubricant through any suitable device.

The material from which the clutch core 37 is made is relatively hard, having a Brinell hardness of 300 to 370. The bush 40 is made of a special bronze. For effecting the engagement of the clutch the pressure medium is allowed to enter the hollow space 42 of the clutch core through the channel 44. If the pressure of the pressure medium in the space 42 has reached about 50 atmospheres the thin wall of the clutch core 37 has expanded or increased in diameter to such an extent that the play of 0.1 mm. in the case of small clutches, up to 0.3 mm. in very large clutches has disappeared, so that by pressing the clutch core against the bush 40 frictional engagement is effected. If the pressure of the pressure medium rises still further the thin wall of the clutch core 37 starts to press against the wall of the bush 40 and the shaft 36 is caused to rotate. If, for example, the pressure in the hollow space 42 rises to 200 atmospheres the pressure between the friction surfaces rises to about 150 kg. per sq. cm. and if the pressure in the hollow space 42 rises to about 500 atmospheres the pressure between the friction surfaces is 450 kg. per sq. cm. The conditions of operation are thus extremely favourable for the clutches. Wear is extremely small if the material is correctly selected and there is adequate lubrication. The load capacity is extremely great if it be considered that such a clutch can be driven perfectly with a pressure of 500 atmospheres or over existing in the hollow space 42. The frictional coefficient in the case of an expanded clutch core is, according to present knowledge, about 0.15, whereas the frictional coefficient for free running (liquid friction) is about 0.02. There cannot be on the thin wall any premature fatiguing of the metal from which the clutch core is made, because in the expanding of the thin wall by $\tfrac{1}{10}$ mm. and $\tfrac{1}{10}$ mm. respectively the stress is maintained at an average of about 800 kg. per sq. cm. The metal from which the clutch core 37 is made has, however, an elastic limit of 75 kg. per sq. mm. On the other hand the wall is not so thick that the elastic limit cannot even then be exceeded if the clutch core were to be under the influence of the high pressure of the pressure medium without the clutch sleeve around the clutch core. Normally, however, the clutch core cannot be stressed to any greater degree than corresponds to its distension of $\tfrac{1}{10}$ mm. and $\tfrac{1}{10}$ mm. respectively, because the stiff steel clutch sleeve 39 with the bush 40 prevents any distension beyond the amount indicated and therefore also prevents any additional stressing.

The action of the clutch, put shortly, is a change in the conditions from a loose bearing to a tight joint or a shrunk-on joint on engagement or conversely on disengagement. A consideration of the conditions indicates that by reason of the friction coefficient which completely changes during close fit or during shrunk-on fit as compared with the loose fit the clutch of relatively small dimensions is suited to the transmission of large turning moments. An important improvement in the clutch is that, for example, in the case of presses, shears, punches or the like the clutch can make partial thrusts and can be easily disengaged while under full load. It is therefore effective as a control clutch because, for example, where a machine or the like commences to be over-loaded the clutch can be instantaneously disengaged by a control actuated by the machine itself. It is a simple matter to construct the control so as to be able to engage and disengage the clutch rapidly or slowly according to the needs of the drive. As the clutch occupies little space, and can run totally immersed in oil and is not provided in the interior either with rods or packings, it is very suitable for use in precision apparatus. In one and the same clutch the clutch core as well as the clutch sleeve can be provided with a hollow chamber and further examples of construction can be cited which do not depart from the scope of the invention.

Figure 8:
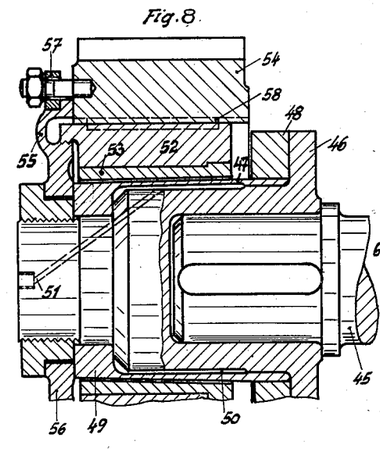
Figures 8 to 13 show, in longitudinal section, particular constructions of the tubular expansible part of the hollow member of the coupling.

In the construction according to Figure 8 the hub 46 is keyed to the driving shaft 45. The clutch core 47 surrounds the hub 46 and serves to produce frictional engagement with the toothed wheel which is to be driven, and is secured to the hub 46 by means of the shrunk-on ring 48, the purpose being first to transmit the movement of rotation and in addition to render unnecessary the use of special means for maintaining a tight joint. The left hand end of the clutch core 47 is provided with a flange-like shoulder 49 which in turn is shrunk on the reduced end portion of the hub 46 of the clutch. Between the hub 46 and the clutch core 47 a hollow space 50 is formed into which the pressure medium (water or oil under pressure, compressed air or the like) is fed through the channel 51. The reduced end portion of the hub 46 is provided with a screw-threaded extension which serves the purpose hereinafter described. The bush 53, which encloses the slightly conical clutch core 47 is secured in the clutch sleeve 52 and is of conical shape to correspond to the conical form of the clutch core 47. The clutch core 47 which, as hereinbefore described, is fixed to the driving spindle 45 rotates, in the bush 53 which in turn is secured to the clutch sleeve 52 upon which is mounted the toothed wheel 54. The adjustment of the bearing so constructed is effected by the flange disc 55, which is in threaded engagement with the screw-thread of an annular projection of the sleeve 52. The flange disc 55 is rotatably mounted in the groove formed between the flange-like shoulder 49 and a screw-threaded ring 56 engaging the screw-threaded extension of the hub 46. The flange disc 55, on being rotatably adjusted, moves relatively to the clutch sleeve 52 which, by reason of the screw thread engagement with the flange disc 55, is caused to move axially. The toothed wheel 54 does not change its axial position while the flange disc is being adjusted, by reason of the connection thereto by bolts, of which one is shown, of the clamping ring 57 which is rotatably seated on the flange disc 55. The clutch sleeve 52 is, however, moved axially with the bush 53. The key 58 which prevents rotary movement of the toothed wheel with respect to the clutch sleeve. After the adjustment has been satisfactorily made the bolts of the clamping ring 57 are tightened to secure the relatively rotatable parts together.

The apparatus operates in the following manner:

When a pressure medium is fed into the hollow space 50 the exposed wall of the clutch core 47 which is between the flange-like shoulder 49 and the shrunk-on ring 48 is expanded and is pressed against the bush 53 of the clutch sleeve 52, the pressure being so great that the clutch sleeve 52 and the toothed wheel 54 are carried round with the core. When disengaging, the clutch core 47 regains its original condition. By means of this construction the clutch sleeve 52 with the corresponding toothed wheel 54 can be readily fitted in place and removed again.

Figure 9:
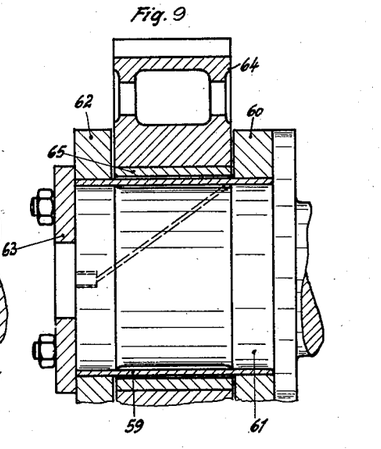

According to Figure 9 the clutch core 59 at one end is shunk hot on the shaft 61 by the use of the shrunk-on ring 60. The left-hand end of the clutch core 59 is turned on its external periphery of slightly conical form and is forced tightly on to the shoulder of the shaft 61 by means of the ring 62 which is bored out conically on the contacting surface to correspond to the form of the clutch core 59, and is secured by the securing disc 63 against working loose.

This method of fitting, consisting in forming the contacting surfaces of the concentric parts to a slightly conical formation and driving the one part into or over the other is termed "cold shrinkage". This "cold shrinkage" serves the purpose of enabling the toothed wheel 64 which is secured to the bush 65 to be fitted in position and removed again when necessary as a unit when it is not desired to make the toothed wheel 64 with the bush 65 in divided form.

Figure 10:
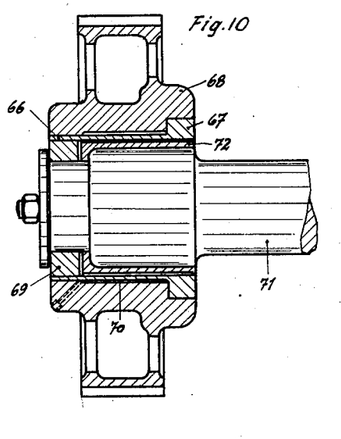
Figure 11:
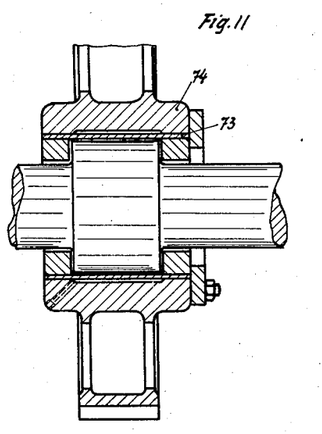

Whereas in the constructions illustrated in Figures 8 and 9 the expansible hollow member is provided on the shaft, in the constructions according to Figures 10 and 11 the hollow member is provided in the clutch sleeve.

According to Figure 10 in which the expansible clutch ring 66 is provided at one end with an external flange 67, this flange is shrunk by heat into the clutch sleeve 68 which is formed as a toothed wheel by heating the hub of the latter. On the other end of the clutch ring 66 the shrinking into the clutch sleeve 68 is effected by means of the ring 69. 70 is the space for the pressure medium which space is formed between the clutch core 66 and the clutch sleeve 68. The stub end of the shaft 71 carries the bush 72 which is secured to it. In this construction the clutch sleeve 68 with the ring 66 can be directly withdrawn from the shaft on removal of the retaining disc 71'.

In Figure 11 the clutch ring 73 is secured to the toothed wheel 74, which at the same time acts as clutch sleeve, on the one hand by hot shrinkage and on the other by cold shrinkage with the assistance of rings.

Figure 12:
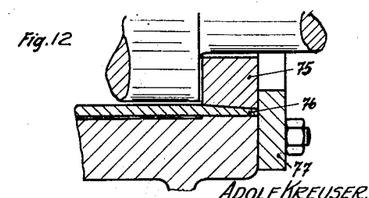

Figure 12 shows on an enlarged scale the carrying out of the cold shrinkage in the clutch according to Figure 11. In this connection the ring 75, which is turned of conical form on its external face is driven into the end of the clutch ring 76 which is likewise conical, and is held in this position by the ring 77.

Figures 13, 14, 15:
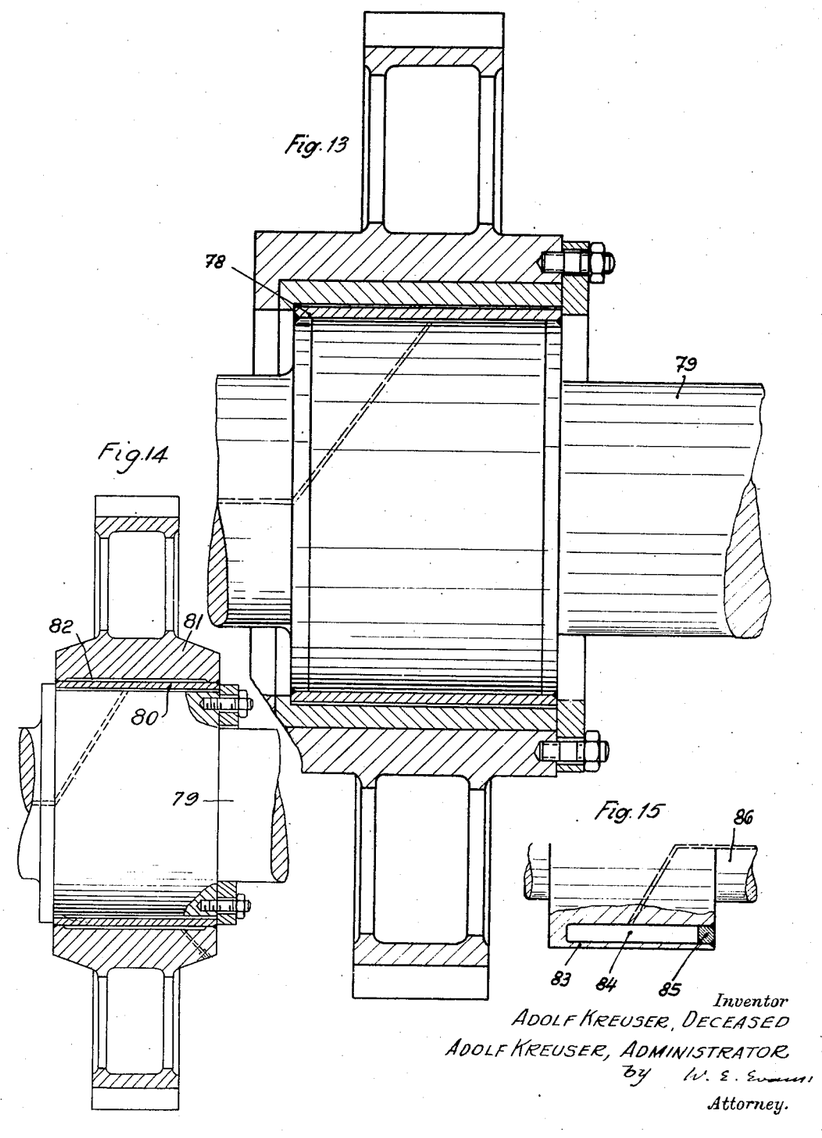
Figure 14 shows, in longitudinal section, a modification of the construction of tubular expansible part represented in Figure 13.
Figure 15 is a part section of a further modification of tubular expansible part.

According to the Figure 13, which figure represents a modified construction of the clutch according to the invention, the clutch core 78 is secured at its ends to the shaft 79 by welding so as to form a tight joint, the shaft being turned of reduced diameter between the ends of the core 78 to form the pressure space. According to Figure 14 the clutch core 80 is welded to the clutch sleeve 81, the pressure medium chamber 82 being formed in the clutch sleeve 81 which in this case serves as the hub for the toothed wheel.

A modified construction useful in certain cases is illustrated in Figure 15. In this case the thickened part of the shaft is recessed annularly in one lateral face to form the clutch core 83. The hollow chamber 84 thus produced is closed by the ring 85 which serves to produce a good fit between the clutch core 83 and the shaft 86. In the example illustrated the connection between the ring 85 and the shaft is produced by welding.

In the clutches hereinbefore described it is frequently desirable, especially where the surfaces are lubricated, to shorten the time which is taken in the operation of engagement until the co-acting clutch members are completely in engagement. To effect this the contacting surfaces of the clutch are divided up more or less in some manner or other, for example, in square, rhombic, circular or similar surfaces, by such means as grooving. By the suitable arrangement and dimensions of these surfaces it is a simple matter to adapt the time taken for engagement to the needs of the case. By this process it is possible without trouble to arrive at clutching periods which lie between 0.1 second and more than a minute. If, for example, the surfaces are made relatively small, during the operation of engagement, the lubricant has to move through only small distances and the friction surfaces are thus brought rapidly into complete engagement.

By this means it is possible to cause the friction clutch to engage practically instantaneously. The division of the friction surface of the friction clutch according to the invention into distinct surfaces is illustrated, by way of example, in Figures 14, 15 and 16.

In Figure 16 the pressure medium chamber 89 is provided at the periphery of the driving shaft 87 by correspondingly securing the hollow member 88 forming the clutch core thereon, pressure medium being fed to the chamber 89 from an outside source through the channel 90. When the clutch is not in engagement the driving shaft 87, with the clutch core 88 secured to it to form the expansible hollow member, rotates with the tubular wall 88a in the bush 92 the inner surface of which is grooved peripherally and transversely and which is secured to the clutch sleeve 91. The sleeve 91 has keyed to it the pinion 93 which serves for conveying away energy.

Figures 17 and 18 illustrate the bush 92 the surface of which is divided by a system of peripheral lubricant channels 95 and longitudinal lubricant channels 94, into separate rectangular surfaces, the channels being relatively deep.

Figure 19 shows on an enlarged scale the continuous film of lubricant 96 that is present in the free running condition of the clutch described, and it further illustrates the paths of flow of the lubricant as far as the lubricant channels.

One very useful application of the clutch hereinbefore described having effects which cannot be obtained with the clutches already available is obtained in mechanically driven machines such, for example, as presses of every kind (forging presses, artificial resin presses, punching presses, drawing presses and similar presses) shears, stamps, and the like.

The friction clutches hereinbefore described have the advantage that they are put into engagement without shock and can be engaged or disengaged while transmitting turning moments of any degree and put into and out of engagement under full working stress. With these properties available it is possible by using the friction clutch according to the invention on machinery to combine the good qualities of a mechanical machine with the new properties of the clutch in an ideal manner.

Machines which are fitted with the known types of disengaging clutches have the following disadvantages:

I. If the machine is fitted with one of the known types of friction clutch, the clutch is mounted on the high speed motor shaft or a relatively rapidly rotating counter-shaft as these known constructions are not adapted to transmit very large or even large turning moments. To permit power to be transmitted, also, most machines are so constructed that large transmission wheels and gearing are necessary. The momentum of these wheels is sufficient alone to affect the machine that is under load, when the clutch is disconnected. Thus it is obligatory in order to prevent such disturbances to protect the machine by hydraulic and other safety devices. These elements have disadvantages such as undesirable high elasticity at the position at which power is transmitted, an increased cost and complication of the whole machine. It is obvious that a clutch provided on the motor or a motor shaft or a counter-shaft does not admit of exact control of the machine precisely because of the inertia of the intermediate gearing and the large masses. Exact control is, however, of the greatest importance on most presses, stamps and the like.

II. Machines which are provided with other known engaging and disengaging clutches (such as dog clutches, pin clutches, rotating wedge clutches and similar clutches which must, however, operate as a rigid connection during the actual operation of the machine) have the disadvantage that it is not possible to engage the parts of the clutch in any position that may be desired because the driving member must first take up a particular relative position with respect to the driven member to produce the clutching action. It is known that with such clutches disengagement is not possible under load. If therefore when such clutches are in use resistance is offered which is greater than that allowable for the machine, the machine unquestionably may be damaged, provided that safety devices with their known disadvantages are not protecting the machine against such damage. Exact control is impossible with this type of clutch as engagement or disengagement is not possible in any position that may be desired.

III. Electro-magnetic clutches, which in themselves to a certain extent meet the demands made on an ideal clutch as regards being able to engage or disengage in any position, have the great disadvantage that they are not suitable for large turning moments. One is consequently compelled to effect clutching at a high speed. Furthermore, they are unsatisfactory in that the magnetizing necessary for the engaging operation and the demagnetizing necessary for disengaging always take periods of about a second. Apart from the fact that the clutch must be provided on the motor shaft or on a rapidly rotating counter-shaft (disadvantages referred to in the paragraph numbered I) the engaging or disengaging time is one second, so that it is not possible to have complete control of the machine especially necessary in time of danger. If it be assumed for example that in the case of a press which is operating at the speed of 300 mm. per second, there is a sudden inadmissible high resistance developed the machine will have stopped or even have been damaged long before the disengaging operation of the clutch is completed. Consequently the influence of the rotating masses and their great kinetic energy is left out of consideration. The magnetic clutch, therefore, with respect to its special qualities, by no means satisfies the demands to be made upon an ideal clutch, and still renders necessary the use of the safety elements which have already been described but which to say the least are unsatisfactory in action.

IV. Starting with the knowledge of the inadequacy of the known types of clutch a partial change was made in the direction of fitting the machines with reversing motors without, however, in so doing finding the ideal control. This is quite clear from the very fact that reversing motors need a starting-up time of at least one second and a stopping time of not less than half a second. The stopping time, however, even with very good reversing motors, the cost of which is extremely high, is such that breakdown of the machine is not impossible at moments of danger. Practice shows that when reversing motors are employed it is not possible to operate without the use of safety devices, which usually are faulty in operation.

V. Purely hydraulic plants have excellent controlling means provided but the enormous expense of the plant and the low efficiency render their use uneconomical.

It will be seen from what has been stated in paragraphs I to III that mechanical presses already fitted with known engaging and disengaging clutches still have disadvantages the elimination of which has hitherto been impossible although this is highly desirable in the interests of safety and of the plant.

The use of the friction clutch according to the invention with machines of all kinds particularly forging presses, metal extrusion presses, artificial resin presses, perforating presses, drawing presses, shears, stamps and the like, introduce advantages unobtainable with the known forms of clutch. The clutch according to the invention is excellently suited, as experiments have shown, for transmitting extremely large turning moments. The possibility is thus provided, as has been demonstrated by experiments, of applying the clutch to machinery and therefore of avoiding the considerable disadvantages set forth under paragraphs I to V and which are inevitably involved in the application of a clutch to the motor shaft or a high speed counter-shaft as regards its capacity for manipulation.

With regard to the capacity for control of the clutch hereinbefore described, a great number of experiments spread over many months have demonstrated that the clutch can be engaged and disengaged in every position practically instantaneously, and it has to be emphasized that the clutch can be disengaged under full load at any time perfectly and instantaneously. The clutch engages under load perfectly and instantaneously so that it is impossible for the gearing to be damaged. If the clutch be mounted on a slowly rotating shaft the machine can be operated, having regard to the excellent properties of the clutch in a manner which has not been attainable by means of the clutches hitherto employed. This does not take into consideration the fact that the undesirable influence of the rotating masses and their kinetic energy on the capacity for manipulation of the machines can be completely eliminated, by arranging the clutch on the slowly rotating working shaft.

A further advantage of the friction clutch according to the invention, hitherto not attained in so perfect a manner, is that the clutch automatically controls the turning moment which it transmits.

If the maximum turning moment, the amount of which can be exactly determined for each working operation that occurs, independently of the size of the clutch, by adjusting the pressure on the friction surfaces—that is to say by regulating the pressure of the pressure medium—is exceeded, the clutch commences to slip and the working operation is thus instantaneously interrupted. This renders it impossible from the outset for the machine or its parts to be broken. Consequently for the first time the responsibility for the safety of the machine against breakage by overloading is transferred to the clutch. The safety devices which hitherto have been operated by hydraulic, mechanical or other means can therefore be at once dispensed with by the use of the friction clutch according to the invention. This clutch does not therefore represent a clutch merely but it is at the same time an excellent safety element, a safety clutch, which once having functioned is immediately available again without any part being damaged and without the necessity of any part being changed. The clutch according to the invention differs from the safety clutches with shearing pins or the like which have been hitherto used.

A further field of use for the friction clutch according to the invention is in connection with transmission gearing, namely reversing gearing, stepped gearing and combinations thereof. Such gearing is employed in rolling mills, rack-draw benches, crank presses, machine tools, and vehicles. The use of the clutch hereinbefore described in gearing of the kind described offers such advantages over the use of clutches of other types that the machines produce entirely new effects. Reversing gearing provided with known types of clutches takes up considerable space. For such gearing leaf spring clutches provided with friction clutches placed in front are much used because a leaf spring clutch by itself engages with a jerk. In change speed gearing electromagnetic clutches are also employed for reversing, but in this case an electric supply has to be relied upon.

Reversing gears provided with the friction clutch according to the invention can be constructed very easily and they occupy little space. With such gearing any desired turning moment can be transmitted and the actions of engaging and disengaging can be effected without jolting and without the use of intermediate elements.

Change gearing is at the present time constructed with sliding wheels or, when the turning moment is small, with simple friction clutches, whereas the known types of clutches in comparison with the wheels are of dimensions which at the present time are not admissible.

Change gearing fitted with the friction clutches according to the invention are on the other hand so effective that the dimensions of the wheels and pinions do not differ substantially from change gears with sliding wheels. For this reason the construction is exceedingly compact. All the wheels are in permanent engagement and it is possible to change from one speed to another without jolting. It is now also possible to construct stepped gearing which has such advantages over the known stepped gearing that machines having entirely new effects can be built.

What is claimed is:

1. A friction clutch comprising a clutch member with a rigid clutch surface and a hollow clutch member concentric therewith, the said hollow clutch member being bounded on the side adjacent the rigid clutch surface by a clutch surface formed by a tubular expansible wall of metal, the axis of which wall is coincident with the axis of the clutch and the ends of which are rigid and fast to the hollow clutch member to provide a fluid-tight closure to the hollow chamber of the said clutch member, in which a pressure medium is caused to act to expand the metal wall into firm contact with the rigid clutch surface.

2. A friction clutch according to claim 1, characterized in that the tubular wall is of a form such that it may be shrunk into position with respect to the hollow clutch member.

3. A friction clutch according to claim 1, wherein the friction surfaces of the clutch members are conical by reference to the clutch axis and the clutch members are free to move relatively in the axial direction and adjusting means are provided whereby relative axial movement of the clutch members is effected for variation of the width of the interstitial space.

4. A friction clutch according to claim 1, characterized in that filling members partly fill the hollow chamber of the hollow clutch member.

5. A friction clutch according to claim 1, characterized in that the tubular wall of the hollow clutch member is of increased thickness at least at one end.

6. A friction clutch according to claim 1, characterized in that the tubular wall of the hollow clutch member is of a form such that it may be secured at one end by hot shrinkage and at the other end by cold shrinkage to the said hollow member.

7. A friction clutch according to claim 1, characterized in that the hollow clutch member is recessed in one surface for the formation of the tubular wall and in that a plug ring is provided to close the recess to form the hollow chamber.

8. A friction clutch comprising a clutch member with a rigid clutch surface and a concentric hollow clutch member having a hollow chamber closed by a tubular expansible and integral metal wall forming the clutch surface, to said clutch surfaces of the two clutch members operating as bearing surfaces when the clutch is not operated, and means for the application of a pressure medium within the hollow chamber of the hollow clutch member for the expansion of the expansible wall into frictional engagement with the rigid clutch surface.

ADOLF KREUSER,
*Administrator of the Estate of Adolf Kreuser, Deceased.*